United States Patent
Huebner et al.

(10) Patent No.: US 10,156,361 B2
(45) Date of Patent: Dec. 18, 2018

(54) DEVICE FOR DETERMINING A FUEL SPLIT, AS GAS TURBINE OR AN AIRCRAFT ENGINE COMPRISING SUCH A DEVICE AND APPLICATION OF THE SAME

(71) Applicant: Rolls-Royce Deutschland Ltd & Co KG, Blankenfelde-Mahlow (DE)

(72) Inventors: Gerhard Huebner, Berlin (DE); Fabian Leitges, Berlin (DE); Andreas Lewark, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 469 days.

(21) Appl. No.: 14/943,879

(22) Filed: Nov. 17, 2015

(65) Prior Publication Data
US 2016/0138808 A1    May 19, 2016

(30) Foreign Application Priority Data
Nov. 19, 2014   (DE) .................... 10 2014 223 637

(51) Int. Cl.
    *F23R 3/34*     (2006.01)
    *F02C 9/34*     (2006.01)
    (Continued)

(52) U.S. Cl.
    CPC ............. *F23R 3/346* (2013.01); *F02C 7/228* (2013.01); *F02C 9/28* (2013.01); *F02C 9/34* (2013.01);
    (Continued)

(58) Field of Classification Search
    CPC .... F02C 7/28; F02C 7/228; F02C 9/34; F02C 7/22; F02C 9/28; F02C 9/32; F02C 9/26;
    (Continued)

(56) References Cited

U.S. PATENT DOCUMENTS 4,716,723 A * 1/1988 Ralston ................... F01D 21/02
                                                        60/39.281
5,261,222 A    11/1993 Napoli
(Continued)

FOREIGN PATENT DOCUMENTS

DE    19510744 A1    9/1996
EP    0733861 A2    9/1996
(Continued)

OTHER PUBLICATIONS

European Search Report dated Mar. 30, 2016 for counterpart European application No. 15195002.9.
(Continued)

*Primary Examiner* — Gerald L Sung
*Assistant Examiner* — Alain Chau
(74) *Attorney, Agent, or Firm* — Shuttleworth & Ingersoll, PLC; Timothy Klima

(57) ABSTRACT

A device for determining a fuel split, and particularly a final fuel split in at least one staged combustion chamber of a gas turbine or an aircraft engine is provided. The device comprises a first control device for determining a preselected fuel split demand for the staged combustion chamber, wherein this determination can be performed based on the detection of a steady state or the detection of a transient state. The detection can in particular be performed based on a combustion chamber exit temperature, a turbine input temperature and/or a value for the fuel/air ratio.

27 Claims, 6 Drawing Sheets

(51) Int. Cl.
*F02C 9/28* (2006.01)
*F02C 7/228* (2006.01)

(52) U.S. Cl.
CPC ............ *F23R 3/34* (2013.01); *F23N 2037/02* (2013.01); *Y02T 50/677* (2013.01)

(58) Field of Classification Search
CPC ........ F23N 2037/02; F23R 3/34; F23R 3/346; F23R 3/343; Y02T 50/677
See application file for complete search history.

(56) References Cited

U.S. PATENT DOCUMENTS

| | | | |
|---|---|---|---|
| 5,319,931 A * | 6/1994 | Beebe | F02C 7/228 60/39.281 |
| 5,465,570 A * | 11/1995 | Szillat | F02C 7/26 60/39.281 |
| 5,469,700 A | 11/1995 | Corbett et al. | |
| 5,829,967 A | 11/1998 | Chyou | |
| 6,095,793 A * | 8/2000 | Greeb | F02C 9/28 431/11 |
| 6,389,816 B1 | 5/2002 | McCarty et al. | |
| 7,032,388 B2 * | 4/2006 | Healy | F02C 9/28 60/772 |
| 9,097,185 B2 * | 8/2015 | Demougeot | F02C 7/228 |
| 2007/0021899 A1 | 1/2007 | Griffin et al. | |
| 2010/0300108 A1 * | 12/2010 | Demougeot | F02C 7/228 60/773 |
| 2011/0265487 A1 * | 11/2011 | Gauthier | F02C 7/228 60/773 |
| 2012/0017600 A1 | 1/2012 | Saito et al. | |
| 2014/0150438 A1 * | 6/2014 | Ellis | F02C 9/26 60/772 |

FOREIGN PATENT DOCUMENTS

| | | |
|---|---|---|
| EP | 1079179 | 2/2001 |
| EP | 1746347 A2 | 1/2007 |
| WO | WO9309339 A1 | 5/1993 |
| WO | 9517632 | 6/1995 |

OTHER PUBLICATIONS

German Search Report dated Oct. 20, 2015 for counterpart German Application No. 102014223637.1.

* cited by examiner

DEVICE FOR DETERMINING A FUEL SPLIT, AS GAS TURBINE OR AN AIRCRAFT ENGINE COMPRISING SUCH A DEVICE AND APPLICATION OF THE SAME

CROSS-REFERENCE TO RELATED APPLICATION

This application claims priority to German Patent Application DE102014223637.1 filed Nov. 19, 2014, the entirety of which is incorporated by reference herein.

BACKGROUND

The invention relates to a device for determining a fuel split in at least one staged combustion chamber in a gas turbine or an aircraft engine, a gas turbine or an aircraft engine as well as an application of the same.

Staged combustion chambers are used in aircraft engines or gas turbines, wherein the pilot burners of the staged combustion chamber are constantly supplied with a minimum quantity of fuel. By contrast, the main burners of the staged combustion chamber are engaged only when increased performance is required. The ratio of pilot fuel flow to total fuel flow is referred to as the fuel split.

Downstream of a control valve unit that determines the total amount of fuel, a splitter valve unit is provided by means of which the total fuel mass flow can be variably distributed between the pilot burner and the main burner. The control valve unit and/or the splitter valve unit can be controlled by a propulsion-unit governor that provides the desired engine performance for controlling the splitter valve unit. Such a system is known from WO 95/17632 A1 or EP 1 079 179 B1, for example.

When it comes to controlling the valve units, ensuring operational safety is of primary importance. Further goals are the optimization of cost-efficiency and the reduction of emissions (e.g. $NO_x$ emission, smoke, unburnt hydrocarbons).

SUMMARY

For this purpose, devices are required by means of which a final fuel split can be determined in a manner that is reliable and economical under a variety of conditions while also resulting in low emissions.

This is achieved by a device with the features as described herein.

Here, a first control device for determining a preselected fuel split demand for the staged combustion chamber is provided, wherein this determination can be performed based on the detection of a steady state or the detection of a transient state, wherein the detection can in particular be performed based on a combustion chamber exit temperature, a turbine input temperature and/or a value for the fuel/air ratio.

The fuel/air ratio and the combustion chamber exit temperature can be calculated by applying a synthesis method, where further sensor values, such as the compressor exit temperature and pressure, or the total fuel mass flow, may be utilized. Primarily used for detecting the transient state are the thrust lever position and the fuel mass flow or its first time derivative. A fuel split is determined as a result. It can subsequently be converted into a reference value for the valve position based on the total fuel flow, which can for example be done by referring to a table. Then, this valve position is set by a separate control valve unit.

The calculated fuel split may correspond to the final fuel split or may be used as an operand for eventually arriving at a final fuel split.

In one embodiment, a determining means for distinguishing the steady state from the transient state is provided, wherein the distinction can in particular be performed based on a temperature value in a manner that is representative of the fuel split in the staged combustion chamber. An output signal of the determining means affects the position of the first control device. By specifically selecting the preselected fuel split demand depending on the operating condition, it becomes possible to select steady-state or transient-state control and control laws which are designed for the respective operating condition.

In another embodiment, a fuel split demand can be determined based on a smoke limit in order to take into account smoke emissions, wherein the respectively lower value of the preselected fuel split demand and of the fuel split demand for the smoke limit can be determined as a first fuel split parameter. The smoke limit can for example be calculated as a function of the fuel/air ratio.

Apart from smoke emission, the weak extinction limit also represents an important operating parameter, such that, in one embodiment, a second fuel split parameter can be determined based on the first fuel split parameter and a fuel split demand for the weak extinction limit, which is representative of the weak extinction limit of the flame in the staged combustion chamber, and is in particular representative of the lean flame extinction (weak extinction limit, WEX Lim), wherein the respectively higher value of the fuel split demand for the weak extinction limit and the first fuel split parameter can be determined as a second fuel split parameter.

In this way, the smoke emission and the weak extinction limit are taken into account when determining the final fuel split. However, the weak extinction limit has a higher priority according to the logical sequence, such that in the event of a conflict, which may for example occur as a result of sensor inaccuracies or sensor failure and thus as a consequence of an inaccurately determined fuel/air ratio, smoke is tolerated rather than the engine being shut down.

A further embodiment comprises a second control device for determining a third fuel split parameter based on at least one fuel split demand as a function of a backup control law, wherein a presetting of the second control device is in particular selected as a function of the backup control law.

For the overall control of the combustion chamber, it can also be useful to take into account certain abnormal operating conditions in the gas turbine or in the aircraft engine. Therefore, a further embodiment comprises a third control device for determining a fourth fuel split parameter based on at least one fuel split demand for taking into account turbine operating conditions, which can be determined based on a turbine operating parameter for characterizing abnormal operating conditions, wherein particularly the selection of a presetting of the third control device is in particular carried out as a function of the turbine operating parameter for characterizing abnormal operating conditions. Here, a turbine operating parameter can characterize abnormal operating conditions, such as the starting of the turbine, the re-ignition of the turbine, water ingestion, a compressor surge and/or an extinction of the combustion.

In a further embodiment, a fuel split demand for minimal fuel flow can be determined based on the total fuel flow, wherein the respectively higher value of the fuel split demand for minimal fuel flow or of the fourth fuel split parameter can be determined as a fifth fuel split parameter.

In certain operational ranges continuous operation is not possible, such that in one embodiment a fuel split demand for taking into account a prohibited range can be determined based on parameters, with that fuel split demand being representative of a range of fuel flow ratios that cannot be set due to hydrodynamic and/or thermal boundary conditions. Thus, certain fuel splits cannot be set because of hydrodynamic or thermal restrictions (prohibited range, also referred to as "keep-out zone", KOZ), so that commands can only be given outside the prohibited range.

In a further embodiment, a fuel split demand for safeguarding against excess fuel pressure can be determined based on the fuel pressure in the fuel system of the pilot burner, wherein the respectively lowest value of the fifth fuel split parameter, the fuel split demand for taking into account the prohibited range and the fuel split demand for safeguarding against excess fuel pressure can be determined as a sixth fuel split parameter.

Empty volumes inside the fuel lines and injectors can compromise the stability of the compressor, the combustion or the power supply. Therefore, in one embodiment, a fuel split demand for the fuel filling level of the injector can be determined based on the fuel filling level. The transition from pure pilot operation to mixed operation makes it necessary to fill the previously empty volumes of the injectors of the main burner. This process has to take place in a controlled manner with a certain fuel split that represents a compromise between filling time, temporary loss of thrust, and the effect on the stability of the compressor. Here, a filling model provides an advance calculation of how long it will take to fill the main injectors. During this period, the fuel split that has been determined for filling ("priming") is forced.

In order to integrate the values, in one embodiment, a fourth control device can select the fuel split between the sixth fuel split parameter and the fuel split demand for the fuel filling level of the injector, wherein a presetting of the fourth control device is possible through the fuel split demand for the fuel filling level of the injector.

Moreover, in a further embodiment, the fuel split can be set based on the fuel split and/or a fuel split parameter that is characteristic of the smoke limit, the limit value for the weak extinction limit, a turbine operating parameter, a backup control law, the total fuel flow, a range of fuel ratios that cannot be set due to hydrodynamic and/or thermal boundary conditions, the fuel pressure in the fuel system of the pilot burner and/or the fuel filling level.

In a further embodiment, a valve device serves for setting the final fuel split between at least one pilot burner and/or at least one main burner, wherein the at least one pilot burner introduces a richer fuel mixture into the combustion chamber than the at least one main burner. Here, in order to ensure precise operating conditions, the setting of the valve device results from a fuel split that was yielded by a strictly monotonic function.

The objective is also achieved by an aircraft engine as described herein and by the application as described herein.

BRIEF DESCRIPTION OF THE DRAWINGS

Exemplary embodiments of the invention are shown by referring to the following figures.

DETAILED DESCRIPTION

Although embodiments of the device and of the method for setting a final fuel split α will be shown by reference to an aircraft engine below, embodiments for staged combustion chambers are also possible in other turbines, such as in stationary gas turbines, turbines in motor vehicles or in ship engines, for example.

Figure 1:
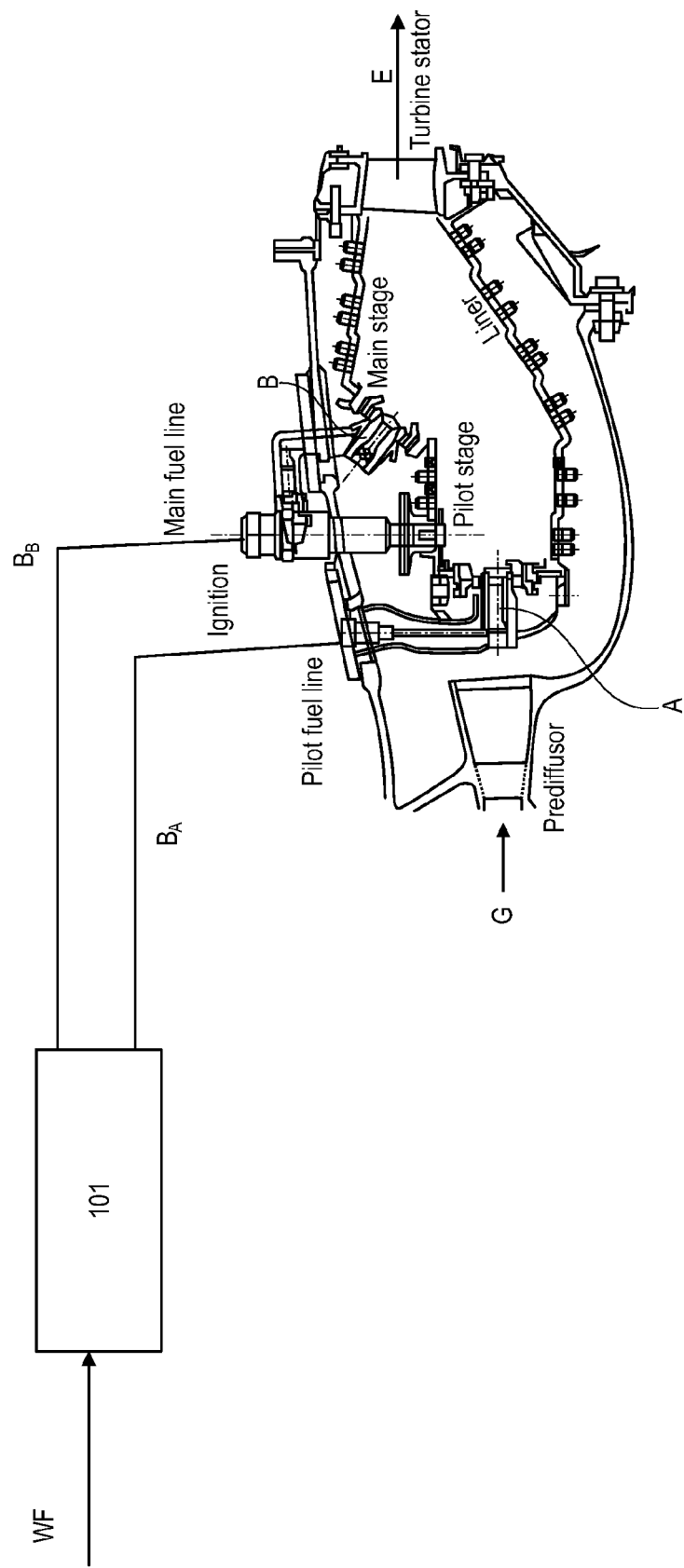
FIG. 1 shows a schematic view of a staged combustion chamber comprising a valve device.

FIG. 1 shows a schematic section view through a staged combustion chamber 100 of an aircraft engine. A gas flow G or airflow containing the oxygen necessary for the combustion is conveyed by an upstream compressor, which is not shown here, and is compressed in the process before entering the staged combustion chamber 100.

The combustion takes place at a total fuel flow WF, which is split into fuel flows $B_A$, $B_B$ that are supplied to different locations of the staged combustion chamber 100.

In the process, the fuel flow $B_A$ is fed via at least one pilot burner A and the remaining fuel flow $B_B$ is fed via at least one main burner B into the staged combustion chamber 100.

The staged combustion chamber 100 shown in FIG. 1 should be understood as merely one example, wherein especially the burners A, B may be arranged differently in other embodiments; in particular, the burners A, B can be arranged inside the staged combustion chamber 100 in a coaxial manner, for example. The staged combustion chamber 100 can be designed in a ring-shaped manner, wherein the injectors of burners A, B can be arranged in a discrete manner at certain angular distances.

During operation of the aircraft engine, fuel is constantly burned in the staged combustion chamber 100 via the pilot burner A, while the main burner B is only engaged if increased performance is required. For example, the pilot burner A is utilized on its own during idling or in the event of a lower fuel flow. If increased performance is required, such as during the takeoff of an aircraft, the at least one pilot burner A serves for providing a better ignition and for stabilizing the at least one or the main burner B. It is possible to completely deactivate the pilot burner A for test purposes.

The combustion exhaust gases are discharged from the staged combustion chamber 100 at exit E and subsequently impinge on a turbine diffuser, i.e. the turbine inlet, which is not shown here.

A fuel split α is defined as the ratio of the pilot fuel flow $B_A$ to the total fuel flow WF:

$$\alpha = \frac{B_A}{B_A + B_B} = \frac{B_A}{WF}.$$

The fuel split α is controlled by a valve device 101 of the aircraft engine, with various calculated values for fuel splits, input variables, characteristic diagrams and/or control laws being used to determine the fuel split α. Hence, the final result of the determination of the fuel split can also be termed the final fuel split α.

Here, the valve device 101 functions with a continuously operating valve, wherein the final fuel split α and the position of the valve are defined by a strictly monotonic function. As such, each final fuel split α is unambiguously and precisely assigned to one position of the valve device 101, and vice versa.

During operation, the aircraft engine has to comply with certain boundary conditions, for example with respect to its safety, environmental friendliness and cost effectiveness, with the boundary conditions being prioritized according to their importance.

Inevitably, the safety of the aircraft engine takes top priority when it comes to selecting the operating point for the final fuel split α.

In the following, embodiments of a control device are described by means of which the final fuel split α can be determined, controlled or regulated.

Figure 2:
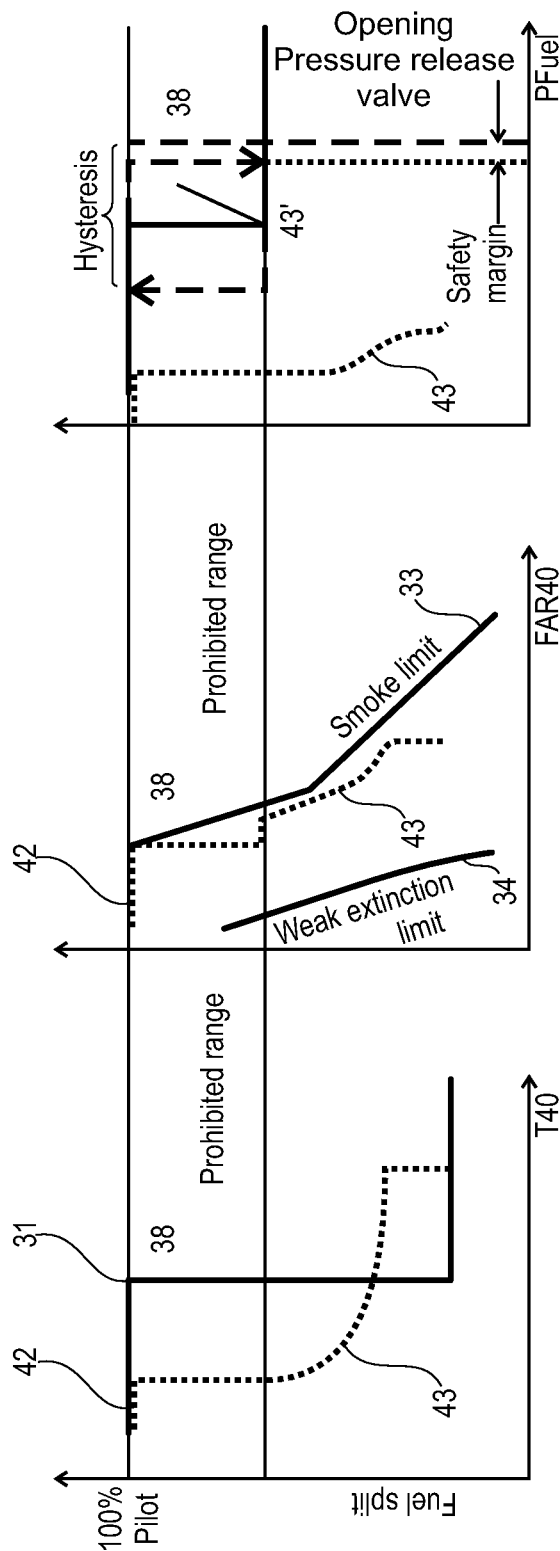
FIG. 2A shows a schematic representation of the boundary conditions for the operation of an aircraft engine comprising a staged combustion chamber within the scope of a steady-state control law.
FIG. 2B shows a schematic representation of the boundary conditions for the operation of an aircraft engine comprising a staged combustion chamber within the scope of a transient-state control law.
FIG. 2C shows a schematic representation of the boundary conditions for the operation of an aircraft engine comprising a staged combustion chamber for safeguarding against excess pressure in a pilot burner fuel line.

Here, FIGS. 2A, 2B and 2C respectively show in a schematic manner operational modes 43 for an acceleration process from idling to takeoff thrust, as well as arrays for certain parameters. The arrays indicate ranges that become undesirable for operation, in other words, operational points should not fall within these ranges.

FIG. 2A shows the behavior under a steady-state control law 31, wherein the values of the fuel split α are indicated on the y-coordinate of the coordinate system. Where α=0, there is a lean mixture, with only the main burner B operating. At the upper margin (pure pilot operation), a rich mixture is present, with only the pilot burner A operating.

The combustion chamber exit temperature T40 is indicated on the x-coordinate of FIG. 2A.

A prohibited range, the so-called keep-out zone 38, is the operational range which cannot be set during operation due to hydrodynamic and/or thermal boundary conditions.

When the aircraft engine is idling 42 (i.e. at the beginning of the acceleration operational mode 43), it is run on a consistently rich mixture, with the combustion chamber exit temperature increasing during acceleration T40. This is symbolized in FIG. 2A by a horizontal line.

Figure 6:
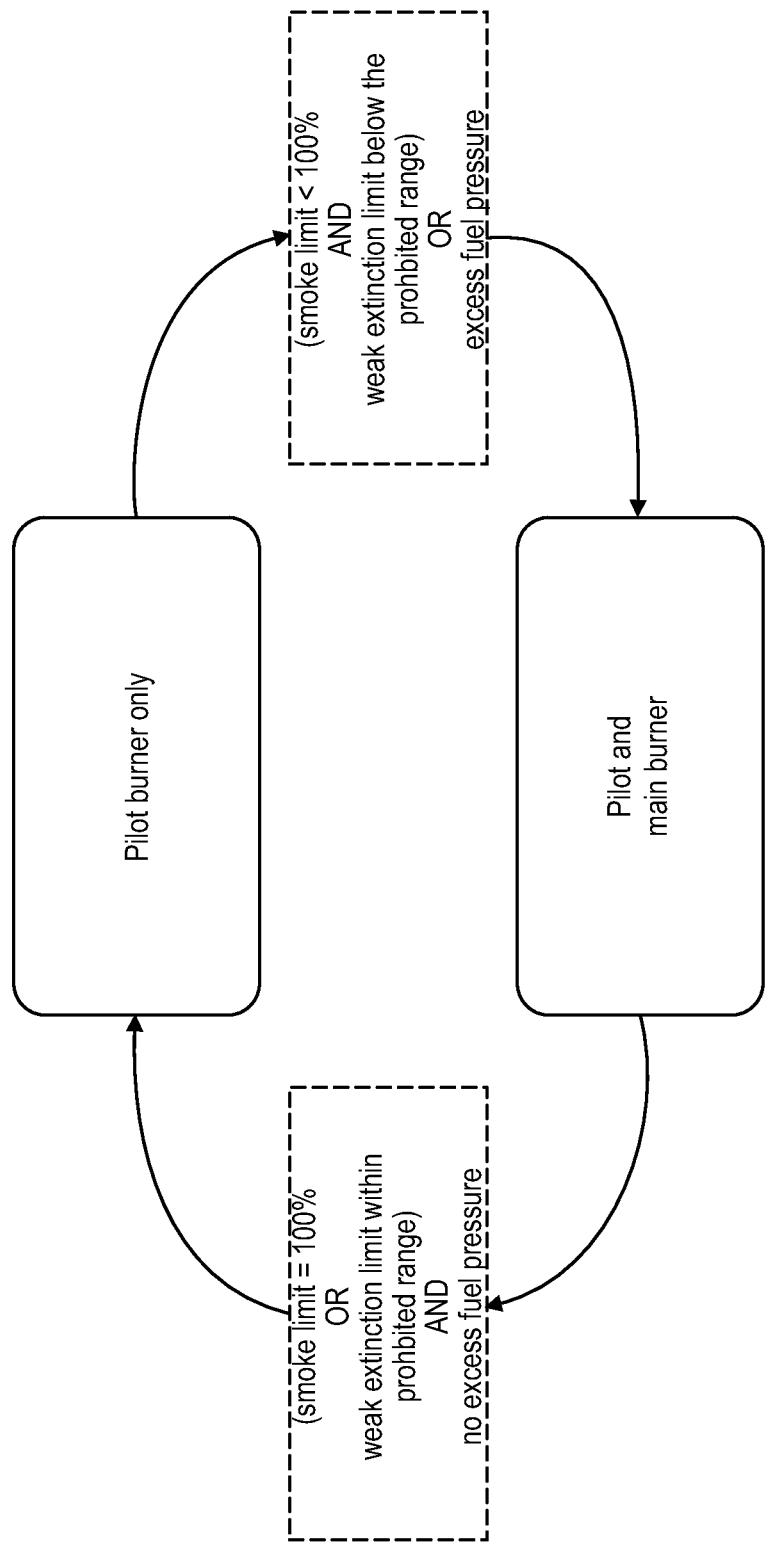
FIG. 6 shows a representation of transition laws from pure pilot operation to mixed pilot/main burner operation, taking into account a prohibited range of fuel splits that cannot be commanded due to hydrodynamic limitations.

In order to reach the actual operating condition, the keep-out zone 38 must be passed through very quickly, i.e. the fuel split must be reduced virtually instantaneously, which is indicated by the vertical line representing the selected split (see also FIG. 6). The desired steady-state value is reached at the end of the acceleration process.

In an analogous manner, FIG. 2B shows the behavior of an acceleration process under a transient-state control law 32. Here, the fuel/air ratio FAR40 is indicated on the x-axis. In this case, the selected split 43 extends between the flame weak extinction limit 34 (safeguard against the extinction of the flame) and the smoke limit 33.

These transient operating conditions 43 can lie between the range of the weak extinction limit 34 and the smoke limit 33. Here, a weighted averaging may be performed, so that the transient operating conditions 43 lie closer to the range of the weak extinction limit 34 in the event of acceleration, and lie closer to the range of the smoke limit 33 in the event of a deceleration.

Should a degradation of accuracy or a failure of any sensor occur, the measurements of which are required in order to calculate the smoke limit 33 and the weak extinction limit 34, the fuel split α will remain in pure pilot operation until the limit for the fuel pressure is reached, and subsequently a fuel split α is set that maintains the pressure distribution within the permissible boundaries. In order to avoid power loss, smoke formation is tolerated in this case.

FIG. 2C shows the behavior based on an operational mode 43 during acceleration, with the aim being a safeguard against excessive fuel pressure 39 in the fuel system of the pilot burner A. Here, the fuel pressure PFuel is indicated on the x-axis.

FIG. 2C shows how any "fluttering" in the control of the fuel pressure 39 can be prevented in the pilot fuel system as the main burner B is disengaged and engaged. Here, a control with a hysteresis is used so that a previous period is taken into account in the control process. In case of acceleration, as the pressure in the pilot fuel system (x-coordinate) increases, the main burner B is instantaneously engaged as soon as a certain pressure limit is reached, so that the fuel split α decreases (alternative operational mode 43', in particular for emergency operation). The value for engaging is below the pressure limit for opening the pressure valve by means of which fuel is returned to the aircraft. That would lead to a loss of control over the engine thrust.

When a deceleration is present, the main burner B is not immediately disconnected again as soon as a certain pressure value is undershot, since this could result in "fluttering". Hence, the main burner B is disengaged again only when the fuel pressure drops below the lower limit, which is indicated by the hysteresis.

In any case, a safety margin to the opening pressure of a pressure relief valve is maintained, whereby loss of thrust control is prevented.

Figure 3:
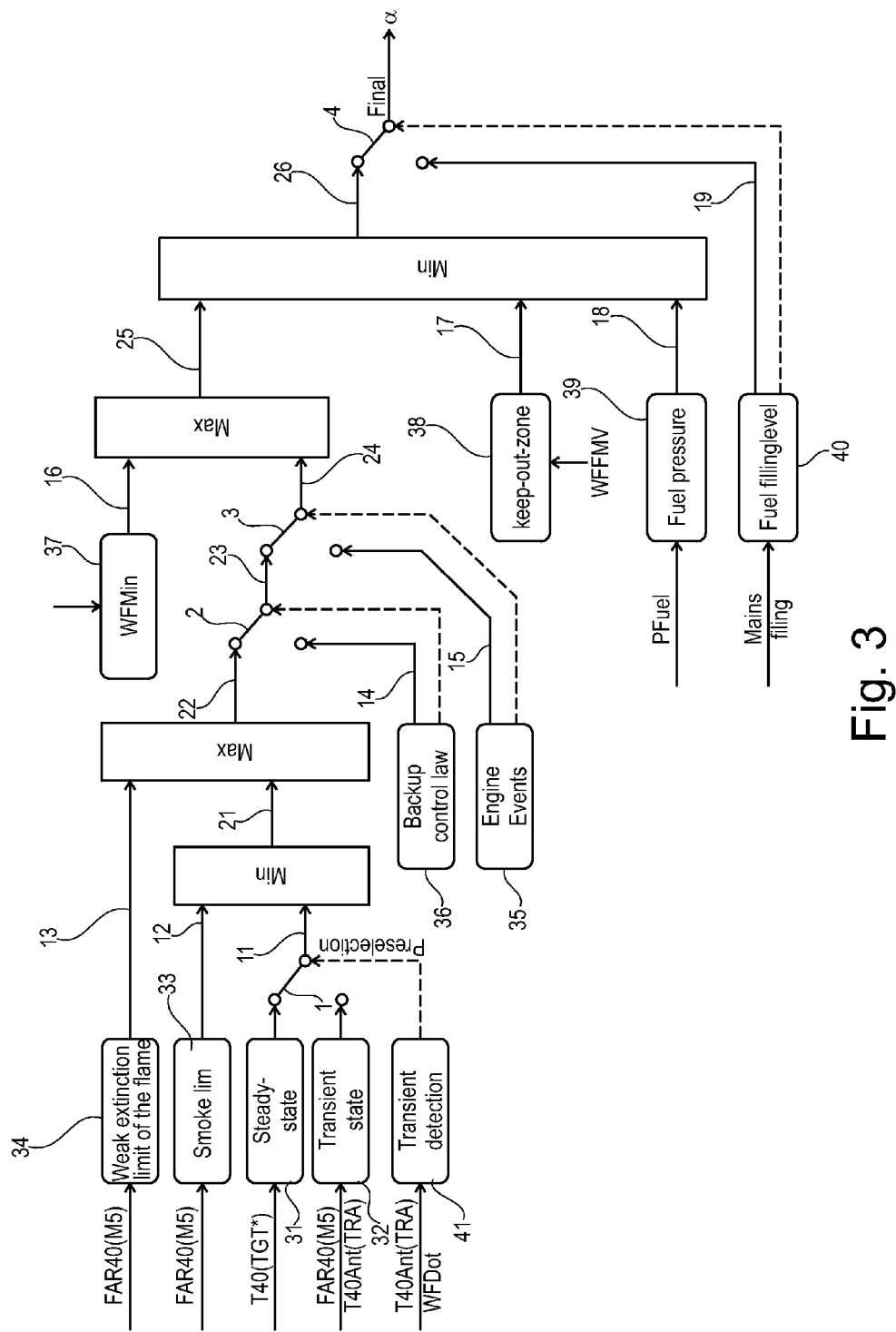
FIG. 3 shows a schematic functional representation of an embodiment of a device for setting a fuel split.

Based on these fundamental relationships, it is explained by referring to FIG. 3 how an embodiment for setting the final fuel split α can ensure that the prohibited fuel splits, such as those depicted in FIGS. 2A to 2C, are avoided and, at the same time, a prioritization of the automatic decisions is implemented, so that safety, operability and cost effectiveness requirements are met.

Here, various measurements and/or calculations are carried out, from which fuel splits 11, 12, 13, 14, 15, 16, 17, 18, 19 are derived. Fuel split parameters 21, 22, 23, 24, 25, 26 are generated from multiple fuel splits 11, 12, 13, 14, 15, 16, 17, 18, 19 (as well as other values or parameters, if required), wherein the generation depends on which of the respective values or parameters represents the highest or lowest value. Different input values can be selected for this comparison by means of the control devices 1, 2, 3, 4, so that the fuel split parameters 21, 22, 23, 24, 25, 26 are determined in a flexible manner and at the same time in a clear hierarchy. Eventually, a final fuel split α is determined.

The starting point for this procedure is a first control device 1, which can switch between the control laws for a steady state 31 (see FIG. 2A, for example) and the control laws for a transient state 32 (see FIG. 2B, for example). The steady-state control laws 31 are designed with a view to efficiency and low emissions and should be applied as often as possible. The transient control laws 32 are designed with view to stability and are applied whenever it is necessary.

In order to determine the suitable control laws 31, 32, temperature values representative of the fuel split are used, for example. For the steady state 31, this may be the combustion chamber exit temperature T40 (see FIG. 2A), for example. For the transient (dynamic) state 32, it may be the fuel/air ratio FAR40 (see FIG. 2B) or an estimated turbine input temperature T40ant, for example. The turbine exit temperature T40ant can for example be estimated based on the position of the throttle lever. In this way, the turbine exit temperature T40ant at the end of a transient maneuver can be predicted based on the position of the thrust lever, so as to be able to anticipate any change in the thermodynamic conditions when setting the fuel split.

The output values of the control laws 31, 32 can be referred to as a fuel split demand for the steady state (steady-state pilot split demand) and as a fuel split demand for the transient state (transient pilot split demand). The first control device 1 selects from these fuel splits.

Here, a determining means (determining unit) 41 (such as a Full Authority Digital Engine Control (FADEC) computer, or an Engine Control Unit (ECU)) for distinguishing the steady-state from the transient-state operation serves for controlling the first control device 1 (indicated by the dashed line in FIG. 3). At that, the determining means 41 is controlled based on the estimated turbine input temperature T40ant. These correlations will be described in more detail in connection to FIG. 4.

The preselected fuel split demand 11 thus obtained is subsequently compared to a fuel split demand for the smoke limit 12, wherein the fuel split demand for the smoke limit 12 is generated from a measurement and/or calculation of the smoke limit 33. The respectively lower value of the preselected fuel split demand 11 and of the fuel split demand for the smoke limit 12 is set as the first fuel split parameter 21.

This selection of the lowest (in other cases also of the highest) value for the fuel splits 11, 12 is carried out by means of a standardization of the input values with respect to a number range for the fuel split, so that a dimensional comparison of the fuel splits 11, 12 as input values and the fuel split parameter 21 as an output value is facilitated. This applies to all min./max. blocks that are depicted in FIG. 3, for example.

A comparison with FIG. 2B shows that the range of the smoke limit 33 is set at this position, meaning that in principal it is ruled out for operating parameters. However, as will be shown in the following, this range is not completely excluded based on the fact that the weak extinction limit 34 has a higher priority and is taken into account in the subsequent step.

A fuel split demand 13 for the weak extinction limit 34 is generated from a measurement and/or calculation, which allows conclusions about the weak extinction limit 34 (WEX). This fuel split demand 13 for the weak extinction limit 34 is then compared to the preselected fuel split demand 11, wherein the respectively highest value is determined as the second fuel split parameter 22. A comparison to FIG. 2B reveals that taking into account the weak extinction limit 34 and the smoke limit 33 already provides a relatively narrow range for the operating parameters. Here, it is ensured that the weak extinction limit 34 has a higher priority than the smoke limit 33. Thus, in a concrete case, the lower one of the fuel splits 11, 12 is selected as "less pilot"; whereas when it comes to the fuel split demand for the weak extinction limit 13 and the fuel split parameter 21, the higher one, i.e. "more pilot," is selected. When in doubt, the command "more pilot" is given in order to keep the engine running, even if smoke is generated in the process.

Proceeding from this logic, further operating values are selected with second and third control device 2, 3, based on which further fuel split parameters 23, 24 are subsequently determined.

At first, the second control device 2 can select a backup control law 36, which provides a fuel split demand 14 for taking into account a backup control law. The backup control law 36 uses the steady-state fuel split and a simplified assumption of the transient-state fuel split and uses the respectively more conservative (i.e. the higher) of these. For example, the backup control law 36 is selected by the second control device 2 if an error has been detected in the sensor inputs for the nominal control laws. Here, the error management also takes into account the "severity" of the error. When the deviations are minor, the flawed value is continued to be used or is replaced by a model.

Based on this, the third fuel split parameter 23 is subsequently generated. The third control device 3 then goes on to evaluate turbine operating parameters 35 for characterizing abnormal operating conditions (see FIG. 5), wherein the evaluation yields a fuel split demand 15 for taking into account turbine operating conditions. The third control device 3 then selects from the third fuel split parameter 23 and the fuel split demand 15 for taking into account turbine operating conditions, and provides a fourth fuel split parameter 24.

The embodiment that is shown here is designed for maintaining the aircraft engine in low-emission operation for as long as possible, with safety requirements always having the highest priority. It is also ensured that the conditions are provided with sufficient safety clearances.

This strategy also incorporates the fuel filling level (priming) 40 as well as the consideration of turbine operating parameters 35 for characterizing abnormal operating conditions.

The fourth fuel split parameter 24 is compared to a fuel split demand 16 for minimal fuel flow, which is derived based on a determination of the total fuel flow 37. The control value derived from the total fuel flow 37 serves to prevent splitting from taking place outside of pure pilot operation if the total fuel flow 37 is very low. The problem in such a case is that, during main burner operation, the mass flow is distributed to twice the number of nozzles as compared to pure pilot operation A. These nozzles are secured by means of spring-loaded control valves and are subject to production tolerances. In the event of a very small mass flow, only a part of the valves would open and a strongly inhomogeneous temperature distribution would occur at the combustion chamber exit, as only some of the burners would be active. The resulting temperature peaks could result in damage to the turbine.

The respectively higher value constitutes the fifth fuel split parameter 25. The latter is compared to two other fuel splits 17, 18, with the lowest of the three being set as a sixth fuel split parameter 26.

Here, a fuel split demand 17 for taking into account a prohibited range is generated from a transition rule which addresses the controlled passage of the so-called keep-out zone 38 (prohibited range). This is explained in more detail in FIG. 6.

At that, the fuel split demand 18 for safeguarding against excess fuel pressure is derived from a measurement and/or calculation of the fuel pressure 39 PFuel in the fuel system of the pilot burner A. During pure pilot operation A, it is not possible to inject the maximal fuel flow for the takeoff thrust. This would result in the fuel system being damaged as a consequence of excess pressure. In this event, a pressure relief valve is provided for the purpose of returning the fuel back to the aircraft, which, however, entails that the regulation of the total mass flow WF no longer functions correctly. As a consequence, there would be a significant loss of thrust during takeoff. In order to prevent the pressure relief valve from opening, a selecting a pilot split below pilot-only should be initiated in advance. This situation can only occur if the preceding control in the logic have failed, for example as a result of undetected sensor errors, and if they give the command for pilot-only operation even though the main injector could have already been engaged.

Finally, a fourth control device 4 selects from the sixth fuel split parameter 26 and a fuel split demand 19 for the fuel filling level of the injector. The fuel split demand 19 for the fuel filling level of the injector is derived from measurements and/or calculations that relate to the filling of the pipelines with fuel (priming). The priming function is based on a model which integrates the fuel flow with the main burner B. The integrator starts at zero. When a command for transition from pilot burner operation A to main burner operation B is given, the integrator runs up until the "filled" state is reached. This occurs under the model-based assumption that the actual injector fills up at approximately the same rate. Also, a fixed fuel split α is set during the filling process. Once the filling process is completed, the sixth fuel split parameter 26 is passed through as the fuel split α.

In alternative embodiments, not all of the fuel splits 11, 12, 13, 14, 15, 16, 17, 18, 19, fuel split parameters 21, 22, 23, 24, 25, 26 and/or measured values or calculated values have to be always used together. It may be expedient to create sub-combinations of the values.

In this embodiment, robustness is implemented by way of the option of dropping certain requirements, provided that the operational safety of the aircraft engine remains guaranteed and the flight can be continued until maintenance work can be performed on the ground. Thus, a conservative final fuel split α can for example be calculated as an end result, which—although possibly leading to smoke formation—still ensures stable combustion (see backup control law in FIG. 3, for example). What is more, sensors that are diagnosed as having "failed" can be replaced by model values.

Figure 4:
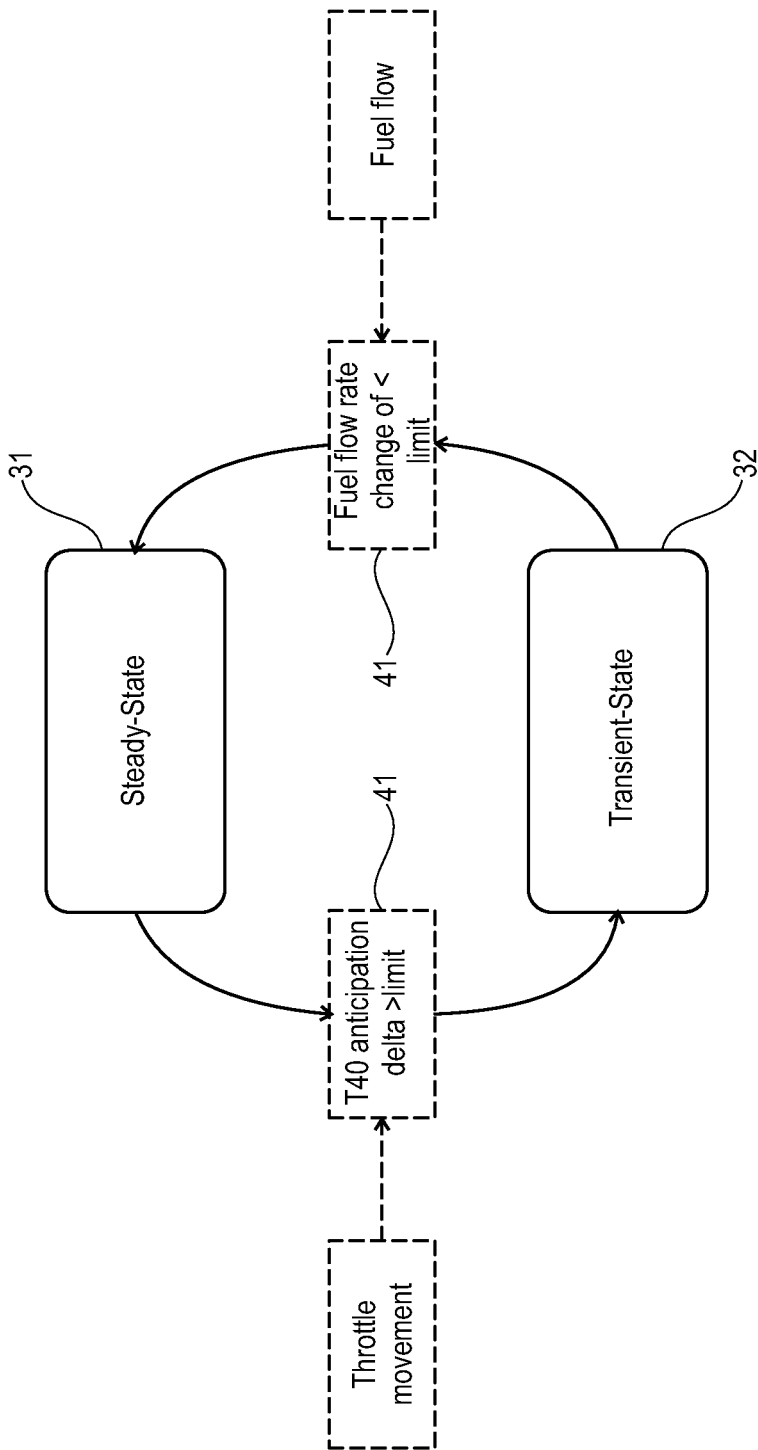
FIG. 4 shows a representation of the detection of steady and transient behavior.

FIG. 4 shows in a schematic manner how the choice between steady-state control laws 31 and transient-state control laws 32 is carried out, wherein the selection is made depending on the determining means 41.

Based on the thrust lever movement for the aircraft engine, the determining means 41 establishes whether the difference in the estimated turbine input temperature T40ant at two different points in time exceeds a certain limit value. Should this be the case, a switch to the transient-state control laws 32 is effected.

Switching back to the steady-state control laws 31 occurs when a measurement and/or calculation of the fuel flow reveals that the temporal change of the fuel flow has fallen below a certain limit value.

Figure 5:
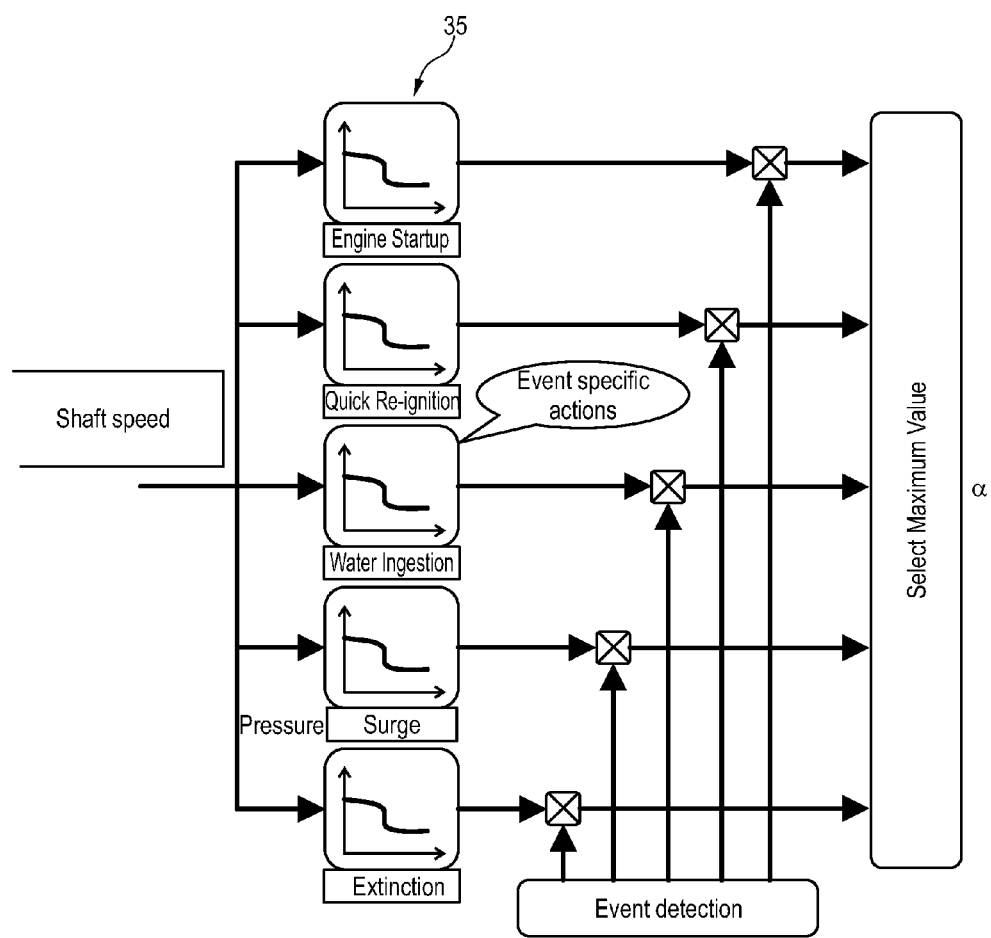
FIG. 5 shows a representation of various turbine parameters for characterizing abnormal operating conditions of the turbine.

FIG. 5 shows in a schematic manner which of the events in the turbine operating parameters 35 for characterizing abnormal operating conditions can be applied within the scope of a device or of a method for setting the fuel split. The issue here is that it may not be possible to correctly calculate the fuel/air ratio and/or the combustion chamber exit temperature T40 during abnormal operating conditions. For this reason, the shaft speed is used in this embodiment as a robust parameter that represents an approximate measure of the energy expenditure within the engine. Once the abnormal condition has ended (e.g. the engine startup is completed, the pump stroke is over, etc.), the optimal control laws are switched back to. When multiple events are active at the same, the event with the highest fuel split is ultimately preferred.

The starting point is the detection of a shaft speed of the aircraft engine. Robustness is increased in this manner, since the temperature measurements or determinations, for example of the combustion chamber input temperature T40, or determinations of the fuel/air ratio FAR40 may be complemented in this way.

Based on this, various—sometimes abnormal—operating conditions may be detected, including startup of the aircraft engine, rapid re-ignition of the aircraft engine, water ingestion, a compressor surge in the fuel feeding system, or an extinction of the burner flame.

In FIG. 6 it is shown for one embodiment how the so-called keep-out zone 38 can be traversed during operation. As shown in connection to FIGS. 2A to 2C, this is a zone in which continuous operation is not possible due to hydrodynamic and/or thermal conditions. During the passing of the keep-out zone 38 it has to be ensured that the fuel flow does not fall below a minimum that is required for cooling the main burner supply lines.

Beginning with an operating condition in which only the pilot burner A is in operation, the main burner B is engaged if one of the following conditions applies:
 a) The smoke limit drops below the pure pilot operation and the weak extinction limit 34 is below the prohibited range (keep-out zone 38).
 b) Excess pressure is present in the fuel system of the pilot burner A.

Switching back to only the pilot burner A occurs if one of the following conditions is met:
 a) The smoke limit allows for pure pilot operation, or the weak extinction limit lies within the prohibited range (keep-out zone 38).
 b) There is no excess pressure present in the fuel system of the pilot burner A.

Accordingly, it is substantially the smoke and weak extinction limits by which the engagement or disengagement of the main burner B is determined.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context. Various features of the various embodiments disclosed herein can be combined in different combinations to create new embodiments within the scope of the present disclosure. Any ranges given herein include any and all specific values within the range and any and all ranges within the given range.

PARTS LIST

1 first control device
2 second control device
3 third control device 4 fourth control device
11 preselected fuel split demand (preselected pilot split demand)
12 fuel split demand for smoke limit (PilotDemSmoke)
13 fuel split demand for weak extinction limit (PilotDemWEX)
14 fuel split demand for taking into account a backup rule set (PilotDemBackup)
15 fuel split demand for taking into account turbine operating conditions (PilotDemEvent)
16 fuel split demand for minimal fuel flow (PilotDemWFMin)
17 fuel split demand for taking into account a prohibited range (PilotDemKOZ)
18 fuel split demand for safeguarding against excess fuel pressure (PilotDemPFuel)
19 fuel split demand for the injector fuel filling level (PilotDemPriming)
21 first fuel split parameter
22 second fuel split parameter
23 third fuel split parameter
24 fourth fuel split parameter
25 fifth fuel split parameter
26 sixth fuel split parameter
31 steady state of a measured value and/or calculated value
32 transient state of a measured and/or calculated value
33 smoke limit
34 weak extinction limit of the flame
35 turbine operating parameters for characterizing abnormal operating conditions
36 backup rule set
37 total fuel flow
38 range of fuel ratios that cannot be set due to hydrodynamic or thermal boundary conditions (keep-out zone)
39 fuel pressure
40 fuel filling level
41 determining means for distinguishing a steady state from a transient state
42 idling
43 operational mode
100 combustion chamber
101 valve device for setting the fuel split
α final fuel split
A pilot burner
B main burner
$B_A$ fuel for pilot burner
$B_B$ fuel for main burner
E combustion chamber exit
FAR40 fuel/air ratio
G gas input flow for the combustion chamber
Priming fuel filling level
T40 combustion chamber exit temperature
T40Ant estimated turbine input temperature
WEXLim lean-flame weak extinction limit
WF total fuel flow

The invention claimed is:

1. A device for determining a final fuel split between a pilot burner and a main burner of a staged combustion chamber of a gas turbine or aircraft engine, comprising:
a determining unit programmed to determine a preselected fuel split demand for the staged combustion chamber based on a detection as to whether the gas turbine or aircraft engine is in a steady state or a transient state and also based on at least one chosen from a combustion chamber exit temperature, a turbine input temperature, and a value for a fuel/air ratio;
wherein the determining unit is also programmed to:
determine a smoke limit fuel split demand based on a smoke limit,
select a respectively lower value of the preselected fuel split demand and the smoke limit fuel split demand as a first fuel split parameter, and
determine the final fuel split based on the first fuel split parameter;
output a final fuel split control signal to a final fuel split valve control device to control the supply of the final fuel split to the pilot burner and to the main burner.

2. The device according to claim 1, wherein the determining unit is also programmed to:
distinguish the steady state from the transient state based on a temperature value in the staged combustion chamber that is representative of the final fuel split,
output a first control signal to a first control device for controlling the first control device to select between the steady state and the transient state.

3. The device according to claim 1, wherein the determining unit is also programmed to:
select a respectively higher value of the first fuel split parameter and a fuel split demand which is representative of a weak extinction limit of a flame in the staged combustion chamber as a second fuel split parameter, and
output a signal to a second control device based on the second fuel split parameter.

4. The device according to claim 3, wherein the determining unit is also programmed to:
determine a third fuel split parameter by selecting between the second fuel split parameter and a fuel split demand based on a backup control law, and
output a second control signal for controlling the second control device to select the third fuel split parameter.

5. The device according to claim 3, wherein the fuel split demand which is representative of the weak extinction limit of the flame in the staged combustion chamber is representative of a lean flame extinction.

6. The device according to claim 1, wherein the determining unit is also programmed to:
determine a fourth fuel split parameter based on at least one fuel split demand based on a turbine operating parameter indicating abnormal operating conditions, and
output a third control signal for controlling a third control device to select a fuel split based on the turbine operating parameter indicating abnormal operating conditions.

7. The device according to claim 6, wherein the at least one turbine operating parameter indicating abnormal operating conditions includes conditions of at least one chosen from starting of the gas turbine or aircraft engine, re-ignition of the gas turbine or aircraft engine, water ingestion, compressor surge and extinction of a combustion flame within the staged combustion chamber.

8. The device according to claim 6, wherein the determining unit is also programmed to:
determine a fifth fuel split parameter by selecting a respectively higher value of the fourth fuel split parameter and a fuel split demand for minimal fuel flow based on a total fuel flow; and
output a signal based on the fifth fuel split parameter.

9. The device according to claim 8, wherein the determining unit is also programmed to:
determine a sixth fuel split parameter by selecting a respectively lowest value of the fifth fuel split parameter, a fuel split demand taking into account a prohibited range, and a fuel split demand for safeguarding against excess fuel pressure based on a fuel pressure in a fuel system of the pilot burner; and output a signal based on the sixth fuel split parameter.

10. The device according to claim 9, wherein the determining unit is also programmed to:

determine a fuel split demand for a fuel filling level of an injector based on the fuel filling level; and output the final fuel split control signal by selecting between the sixth fuel split parameter and the fuel split demand for the fuel filling level of the injector, where a preset selection is the fuel split demand for the fuel filling level of the injector.

11. The device according to claim 1, wherein the determining unit is also programmed to:

determine a fuel split demand taking into account a prohibited range based on parameters representative of a range of fuel flow ratios that cannot be set due to at least one chosen from hydrodynamic conditions and thermal boundary conditions; and output a signal based on the fuel split demand taking into account the prohibited range.

12. The device according to claim 1, wherein the determining unit is also programmed to determine the final fuel split based on at least one chosen from a weak extinction limit, a turbine operating parameter indicating abnormal operating conditions, a backup control law, a total fuel flow, a range of fuel ratios that cannot be set due to hydrodynamic or thermal boundary conditions, a fuel pressure in a fuel system of the pilot burner and a fuel filling level.

13. The device according to claim 1, wherein the determining unit is also programmed to output the final fuel split control signal to control the final fuel split valve control device to control the supply of the final fuel split to the pilot burner and to the main burner such that pilot burner introduces a richer fuel mixture into the staged combustion chamber than the main burner.

14. An aircraft engine or gas turbine, comprising the device according to claim 1.

15. A method for determining a final fuel split between a pilot burner and a main burner of a staged combustion chamber of a gas turbine or aircraft engine, comprising:

determining a preselected fuel split demand for the staged combustion chamber based on a detection as to whether the gas turbine or aircraft engine is in a steady state or a transient state and also based on at least one chosen from a combustion chamber exit temperature a turbine input temperature, and a value for a fuel/air ratio;

determining a smoke limit fuel split demand based on a smoke limit, selecting a respectively lower value of the preselected fuel split demand and the smoke limit fuel split demand as a first fuel split parameter, and determining the final fuel split based on the first fuel split parameter;

outputting a final fuel split control signal to a final fuel split valve control device to control the supply of the final fuel split to the pilot burner and to the main burner.

16. The method according to claim 15, and further comprising:

distinguishing the steady state from the transient state based on a temperature value in the staged combustion chamber that is representative of the final fuel split, outputting a first control signal to select between the steady state and the transient state.

17. The method according to claim 15, and further comprising:

selecting a respectively higher value of the first fuel split parameter and a fuel split demand which is representative of a weak extinction limit of a flame in the staged combustion chamber as a second fuel split parameter, and outputting a signal to a control device based on the second fuel split parameter.

18. The method according to claim 17, and further comprising:

determining a third fuel split parameter by selecting between the second fuel split parameter and a fuel split demand based on a backup control law, and outputting a second control signal to select the third fuel split parameter.

19. The method according to claim 17, wherein the fuel split demand which is representative of the weak extinction limit of the flame in the staged combustion chamber is representative of a lean flame extinction.

20. The method according to claim 15, and further comprising:

determining a fourth fuel split parameter based on at least one fuel split demand based on a turbine operating parameter indicating abnormal operating conditions, and outputting a third control signal to select a fuel split based on the turbine operating parameter indicating abnormal operating conditions.

21. The method according to claim 20, and further comprising providing that the at least one turbine operating parameter indicating abnormal operating conditions includes conditions of at least one chosen from starting of the gas turbine or aircraft engine, re-ignition of the gas turbine or aircraft engine, water ingestion, compressor surge and extinction of a combustion flame within the staged combustion chamber.

22. The method according to claim 20, and further comprising:

determining a fifth fuel split parameter by selecting a respectively higher value of the fourth fuel split parameter and a fuel split demand for minimal fuel flow based on a total fuel flow: and outputting a signal based on the fifth fuel split parameter.

23. The method according to claim 22, and further comprising:

determining a sixth fuel split parameter by selecting a respectively lowest value of the fifth fuel split parameter, a fuel split demand taking into account a prohibited range, and a fuel split demand for safeguarding against excess fuel pressure based on a fuel pressure in a fuel system of the pilot burner; and outputting a signal based on the sixth fuel split parameter.

24. The method according to claim 23, and further comprising:

determining a fuel split demand for a fuel filling level of an injector based on the fuel filling level; and outputting the final fuel split control signal by selecting between the sixth fuel split parameter and the fuel split demand for the fuel filling level of the injector, where a preset selection is the fuel split demand for the fuel filling level of the injector.

25. The method according to claim 15, and further comprising:

determining a fuel split demand taking into account a prohibited range based on parameters representative of a range of fuel flow ratios that cannot be set due to at least one chosen from hydrodynamic conditions and thermal boundary conditions; and outputting a signal based on the fuel split demand taking into account the prohibited range.

26. The method according to claim 15, and further comprising determining the final fuel split based on at least one chosen from a weak extinction limit, a turbine operating parameter indicating abnormal operating conditions, a backup control law, a total fuel flow, a range of fuel ratios that cannot be set due to hydrodynamic or thermal boundary conditions, a fuel pressure in a fuel system of the pilot burner and a fuel filling level.

27. The method according to claim 15, and further comprising outputting the final fuel split control signal to control the final fuel split valve control device to control the supply of the final fuel split to the pilot burner and to the main burner such that pilot burner introduces a richer fuel mixture into the staged combustion chamber than the main burner.

\* \* \* \* \*